(12) United States Patent
Holland

(10) Patent No.: US 6,243,860 B1
(45) Date of Patent: Jun. 5, 2001

(54) MECHANISM EMPLOYING A MEMORY AREA FOR EXCHANGING INFORMATION BETWEEN A PARENT PROCESS AND A CHILD PROCESS COMPILED DURING EXECUTION OF THE PARENT PROCESS OR BETWEEN A RUN TIME COMPILER PROCESS AND AN APPLICATION PROCESS

(75) Inventor: Richard Andrew Holland, Somerset, PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/183,790

(22) Filed: Oct. 30, 1998

(51) Int. Cl.⁷ .................................................. G06F 9/45
(52) U.S. Cl. .................................................. 717/2
(58) Field of Search ................................... 717/2

(56) References Cited

U.S. PATENT DOCUMENTS

| | | | |
|---|---|---|---|
| 5,418,964 | * 5/1995 | Conner et al. | 709/305 |
| 5,421,016 | * 5/1995 | Conner et al. | 717/7 |
| 5,481,722 | * 1/1996 | Skinner | 717/3 |
| 5,511,199 | * 4/1996 | Anthias et al. | 709/303 |
| 5,832,264 | * 11/1998 | Hart et al. | 709/303 |
| 5,913,059 | * 6/1999 | Torii | 709/104 |

OTHER PUBLICATIONS

Li et al., Generating Explicit Communication from Shared–Memory Program References, 1990, p. 865–876.*
Kandermir et al., Compiler Algorithms for Optimizing Locality and Parallelism on Shared and Distributed Memory Machines, 1997, p. 236–247.*
Register, A. The Objects is Integration, 1994. p. 37–40.*
Westinghouse Electric Corporation, *Expander User Manual*, Nov. 19, 1996 (16 pp.).
B.W. Kernighan et al., *The UNIX Programming Environment*, 174–176, 1984.
W. Richard Stevens, "Interprocess Communications" *Advanced Programming in the UNIX$^R$ Environment*, 427–70, 1992.

* cited by examiner

Primary Examiner—Kakali Chaki
Assistant Examiner—John Q. Chavis

(57) ABSTRACT

A computer system includes a central processing unit, a parent process for execution by the CPU, a child process for execution by the CPU, a memory accessible by the CPU, and a run time compiler. The memory includes a memory area for access by both of the parent process and the child process. The run time compiler includes a function port for invoking the compiler during execution of the parent process. A first compiler routine compiles the child process. A second compiler routine executes the child process. A calling chain employs the memory area to exchange information, such as data atoms, between the child process and the parent process.

33 Claims, 9 Drawing Sheets

MECHANISM EMPLOYING A MEMORY AREA FOR EXCHANGING INFORMATION BETWEEN A PARENT PROCESS AND A CHILD PROCESS COMPILED DURING EXECUTION OF THE PARENT PROCESS OR BETWEEN A RUN TIME COMPILER PROCESS AND AN APPLICATION PROCESS

BACKGROUND OF THE INVENTION

1. Field of the Invention

This invention relates to computer systems and, more particularly, to compilers for computer systems.

2. Background Information

A compiler includes a computer process or program which translates a computer language into machine code. An intermediate compiler includes a compiler which translates a higher level computer language into a lower level computer language which is not yet optimized into true machine code.

Intermediate computer language compilers such as Perl (i.e., a computer scripting language), Tcl/Tk (i.e., another computer scripting language), and the various UNIX shell interpreters (e.g., Bourne Shell, Korn Shell and C shell which translate a higher level language into lower level code at run time) serve as "glue" between different computer codes. These languages provide a mechanism for integrating various computer processes and programs to perform specific automation tasks.

In a highly regulated environment, in which various complex computer codes are maintained by numerous teams, configuration and control of information in automation projects is quite difficult. Additionally, users frequently require customization of automated sub-processes to meet plant specific requirements. To this end, prior art computer code was developed to overlay textual information and trace the pedigree of all input and output data which was used to create a computer code input deck, calculation note or report. By employing that prior art computer code, users can customize ASCII information, with such code automatically tracking the customization and providing information to a verifier in report form.

In the nuclear industry, for example, process automation is very complex. Over the decades, numerous engineers have written millions of lines of code. This coding is regulated and controlled. Nuclear reactor safety analysis, for example, demands automation that is not only elaborate, but flexible, to meet the strictest quality assurance standards.

It is known to provide data objects which have size information in object oriented programming. It is also known to process information using symbols. For example, interpreters pass and use symbol pointers. Normally, memory is pointed to, as in a compiled language such as, for example, C, C++ or FORTRAN; or memory is a symbolic string reference in an interpreter, such as Perl or a UNIX shell; or else there is strictly a direct reference to memory in an interpreter, such as BASIC.

It is known to employ memory which is shared between pre-compiled processes m computer systems. It is believed that UNIX "shared memory" is employed between pre-compiled processes, and is compile time bound and managed for synchronization using semaphores or record locking.

It is known to share information and memory across run-time compiled elements in UNIX systems by employing complex and expensive programming techniques such as data-piping and compile time usage restrictions.

It is known in the UNIX operating system argv[ ], argc array interaction with C programs, to pass strings from parent to child, but not from child to parent.

The prior art code is capable of tracing the pedigree of computer code ASCII input data through a process using a conventional UNIX script. However, there is room for improvement.

SUMMARY OF THE INVENTION

It is believed that the prior art cannot track the pedigree of a script process itself. In many situations, a user may wish to employ quality assured components, but customize a particular sub-process and track the pedigree of data, as well as various processes, in a final report.

The present invention provides a computer apparatus including a central processing unit, a parent process for execution by the central processing unit, a child process for execution by the central processing unit, a memory accessible by the central processing unit, and a run time compiler. The memory includes a memory area for access by both of the parent process and the child process. The run time compiler includes means for invoking the compiler during execution of the parent process, means for compiling the child process, means for executing the child process, and means employing the memory area for exchanging information between the child process and the parent process.

As a preferred refinement, each of the parent process and the child process has a pedigree, and the run time compiler further includes means for checking the pedigree of the parent process and the pedigree of the child process at run time. Preferably, the run time compiler further includes means for determining the pedigree of the parent process and the pedigree of the child process at run time, and means for reducing the pedigree of the parent process to the lowest pedigree of the parent and child processes.

As another preferred refinement, the means for invoking the run time compiler includes means employing a function call for invoking the compiler from the parent process. Preferably, the child process includes a plurality of data objects and code objects, and the means for executing the child process includes means employing a return list for forwarding the data objects and the code objects to the parent process from the child process.

As another aspect of the invention, a computer apparatus includes a central processing unit for executing a plurality of processes, a memory accessible by the central processing unit, and an application program. The memory includes a memory area for access by the processes. The application program includes an application process compiled by a first compiler process, and a second compiler process residing with the application process. The second compiler process includes an intermediate language compiler kernel, means for attaching the compiler kernel to the application process, means for invoking the compiler kernel during execution of the application process, and means employing the memory area for exchanging information between the second compiler process and the application process.

As a preferred refinement, the application process is a first application process, and the processes executed by the central processing unit include the first application process and a subsequent second application process. The means employing the memory area includes means for exchanging information between the first application process and the subsequent second application process.

As a further aspect of the invention, a program product comprises a run time compiler and signal bearing media bearing the run time compiler. The run time compiler includes means for invoking the compiler during execution of a parent process, means for compiling a child process, means for executing the child process, and means for exchanging information between the child process and the parent process by employing a memory.

As a still further aspect of the invention, a program product for an application program compiled by a first compiler comprises a second compiler capable of residing with the application program, and signal bearing media bearing the second compiler. The second compiler includes an intermediate language compiler kernel, means for attaching the compiler kernel to the application program, means for invoking the compiler kernel during execution of the application program, and means for exchanging information between the second compiler and the application program by employing a memory.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

As employed herein, a central processing unit (CPU) shall include, but not be limited to, mainframe computers, mini-computers, workstations, servers, processors, personal computers (PCs), as well as other microcomputers, other microprocessor-based computers or networked processors which may or may not employ an operating system (e.g., UNIX, Windows NT, Windows 95, Windows 98).

As employed herein, an application program shall include, but not be limited to, a computer program (e.g., applications for enterprise systems, nuclear design, banking, medical, web server, department systems, engineering, software development, home PC, or other activities in regulated industries) for a CPU.

As is well known, computer programs are constructed using one or more programming languages. Like words written in English, a programming language is used to write a series of statements that have a particular meaning to the drafter (i.e., the programmer). The programmer first drafts a computer program in human readable form (e.g., source code) prescribed by the programming language, resulting in a source code instruction (or statement) stream. This source code instruction stream may be in the form of a high level language (e.g., C, C++, Visual Basic, ADA, Modula-2, Pascal, FORTRAN, Cobol). After programming the source code, the programmer then uses mechanisms that change the human readable form of the computer program into a form that can be understood by the CPU (e.g., machine readable form, machine code, object code). These mechanisms are typically called compilers.

As employed herein, a compiler shall include, but not be limited to, a mechanism which transforms one representation of a computer program (e.g., a computer language) into another representation of that program (e.g., machine code).

As employed herein, an intermediate compiler shall include, but not be limited to, a compiler which translates a higher level computer language into a lower level computer language which is not yet optimized into a form that can be understood directly by the CPU (e.g., true machine code).

As employed herein, a process shall include, but not be limited to, a function, procedure, subroutine, or program.

As employed herein, the term "pedigree" shall encompass a register, value or state recording a line of ancestors of one or more processes and/or one or more datums, and/or defining the quality or purity of such one or more processes and/or one or more datums.

Figure 1:
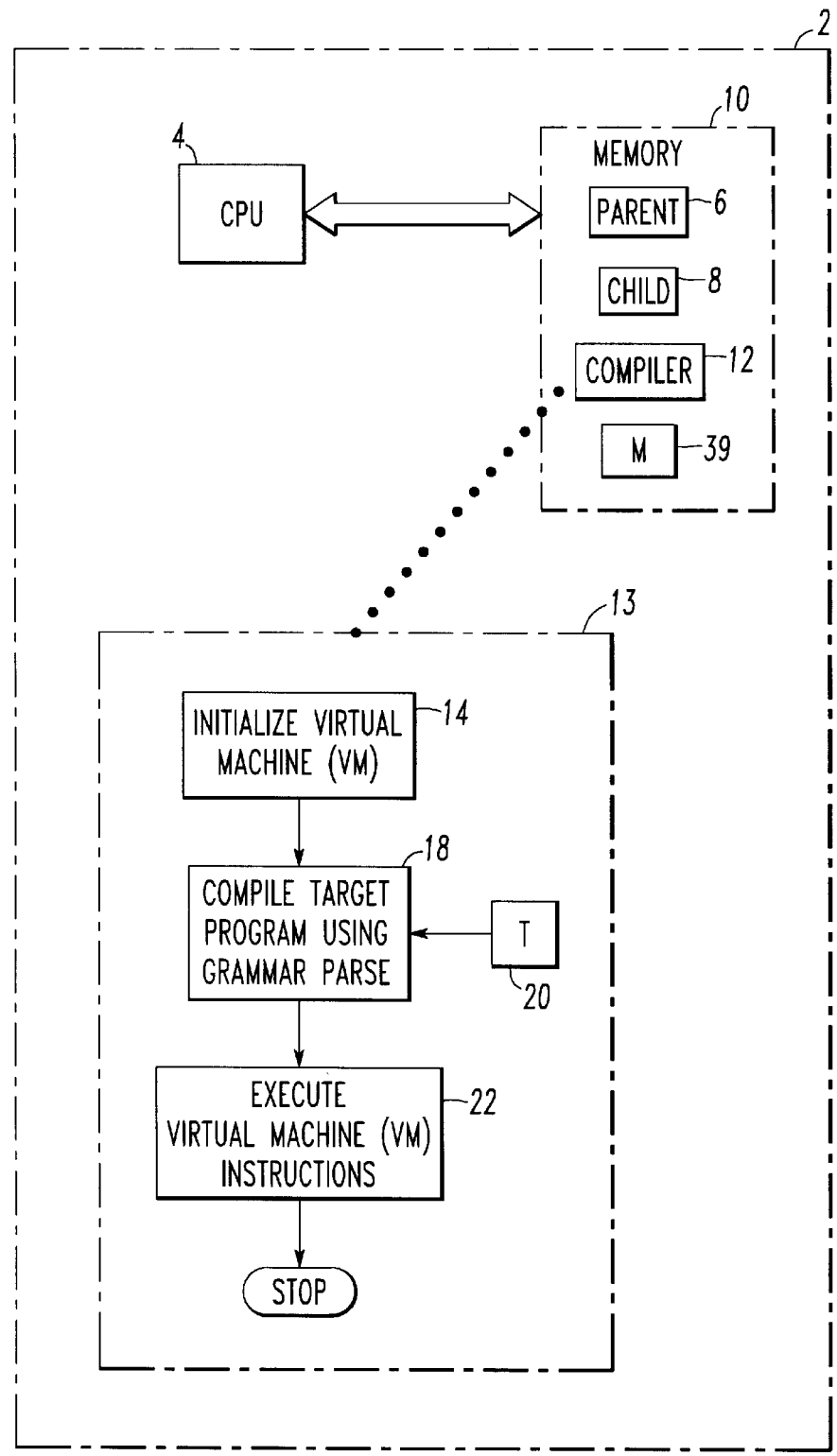
FIG. 1 is a block diagram of the compiler in accordance with the invention when run as a standalone compiler.

Referring to FIG. 1, a computer system 2 includes a central processing unit (CPU) 4, a parent process 6 and a child process 8 which are both for execution by the CPU 4, a memory 10 accessible by the CPU 4, and a run time compiler 12. FIG. 1 also shows the compile time setup of the compiler 12 when it is run as a standalone compiler as contrasted with the application resident compiler (ARC) as discussed below in connection with FIGS. 7–8. Here, the compiler 12 is loaded into memory 10 from a suitable signal bearing media 13 such as a disk.

Figure 2A:
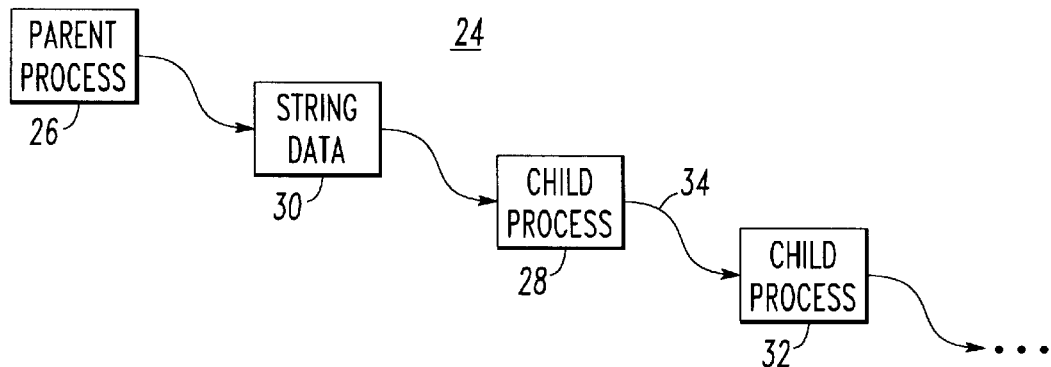
FIG. 2A is a block diagram of dynamic shell objects for a UNIX shell.
Figure 2B:
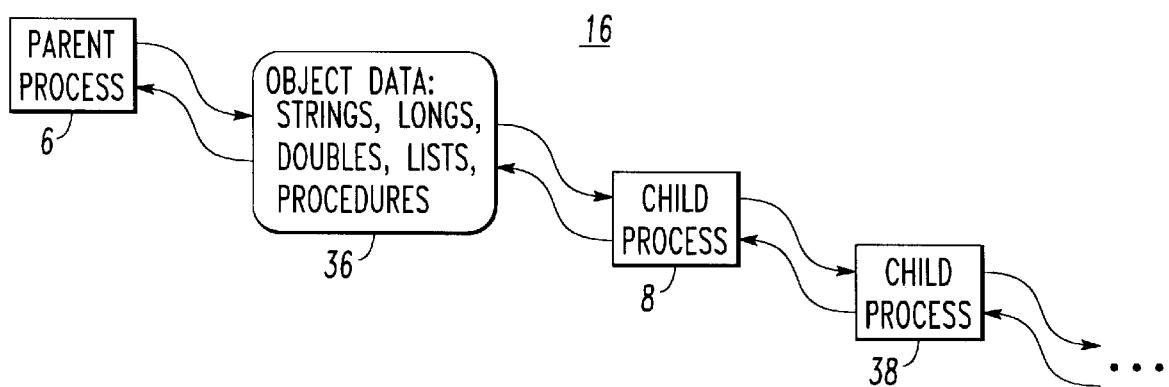
FIG. 2B is a block diagram of dynamic shell objects for the compiler of FIG. 1.

At 14, a virtual machine (VM) is initialized by setting up an instruction machine, reading and initializing C Kernel routines, allocating memory, and establishing an ARGC/ARGV link with a processor shell 16 (as shown in FIG. 2B), wherein argc represents the command line argument of space delimited strings entered during program invocation from the operating system shell, and argv is an array of argc items of the space delimited string images entered during program invocation from the operating system shell. The behavior of argc and argv arrays is defined by both ANSI C and POSIX. 1.

Next, at 18, a target program (T) 20 is compiled by employing a suitable parsing routine to parse language instructions to provide compile time execution and setup, and to establish program blocks in the form of VM instructions. Natural or high level language instructions are translated into intermediate compiler instructions using a language parser. The parser specifies the sequence of language tokens that define a grammar. The parser receives tokens that represent keywords, variables and objects that are defined in the grammar of the language. These are translated into virtual machine instructions in an order which is consistent with the grammatical context of the language and the practical sequence necessary for proper execution of the compiler 12.

Then, at 22, the VM instructions are executed. As employed herein, VM instructions mimic the actions of a CPU. The virtual machine is written using a high level compiler (e.g., C, Pascal, FORTRAN) or assembly language. In the exemplary compiler 12, temporary memory addresses are utilized in a manner similar to machine registers and an instruction pointer is established which is similar to a register instruction pointer. Instructions themselves are written in a higher level language (e.g., C) and the entire compiler is itself compiled to form a virtual machine kernel. Additionally, there is an object oriented virtual machine behavior which is also utilized by the exemplary compiler 12. Such virtual machine behavior is associated with late binding in object oriented languages, where specific references to objects are not resolved until run time. Such compilation behavior is also an aspect of a virtual machine.

In the exemplary compiler 12, a block is a programming element which is delimited by braces (i.e., "{" and "}") and which is often named. The series of code statements of the programming block execute as one statement. The programming block is an independent unit, which inherits arguments and data atoms from parent blocks in which the programming block is defined. See Example 1 ("{if (b:type==long) . . . ") set forth in the Appendix.

As employed herein, a "data atom" or "data atom wrapper" (see, for example, data atom wrapper 58 of FIG. 4) is a structure which contains, for example, (1) a pointer to a value; (2) the name of the value; (3) data pedigree or a pedigree reference; (4) a parent atom list; (5) the type of the value or data; and (6) a storage (atom) type. This memory element is operated by the exemplary compiler 12, for example, when passing information to subroutines or accessing data object attributes (e.g., pointer, name, pedigree, list, type, storage). A data atom is different from a symbol table reference to memory. When data atom a is passed to a process (e.g., process( )), an argument b contains all attributes of the data atom a. Changes to argument b's data atom, such as dynamic array size changes (resize) or pedigree changes, will affect the data atom a.

In the code fragment of Example 1, data atom use is shown. The number of items, :nitems, in an array, a, is used to loop over array a's elements. Additionally, the number of dimensions, :ndim, and dimensional indices, :dim[:ndim], are available for multidimensional arrays (not shown). Further, atom storage access aids employ the dynamic memory allocation (i.e., the allocation or setting aside of memory at run time) of the compiler 12. Use of :pedigree is explained below in connection with FIGS. 6A–6B. In this example, :type information is accessed but does not serve a real purpose. While the compiler 12 employs a strongly typed language, it provides mechanisms for processing unknown objects. These objects are positioned in object lists where :type comes into play.

Referring to FIGS. 2A and 2B, dynamic shell objects illustrate the difference between a UNIX shell 24 and the processor shell 16 for the compiler 12 of FIG. 1. In the UNIX shell 24 of FIG. 2A, string information 30 flows from (but not to) a parent process 26 to (but not from) a child process 28. Also, string information 34 flows from (but not to) the child process 28 to (but not from) another child process 32.

In the processor shell 16 of FIG. 2B, information, including whole object data and coding, is passed from and to the parent process 6 and to and from the child process 8 through a calling chain 36. Furthermore, a plurality of independent child processes 8,38 are complied at run time as the parent process 6 is executed. The memory 10 of FIG. 1 includes a memory (M) area 39 for access by both of the parent process 6 and the child process 10.

Figure 3:
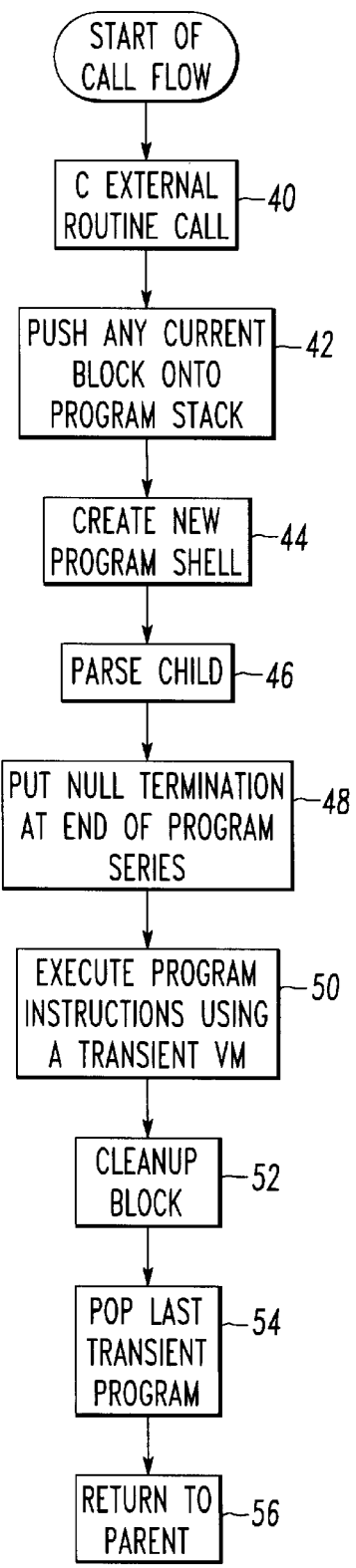
FIG. 3 is a flowchart of the call flow for the compiler of FIG. 1 when executing the child processes of FIG. 2B.

FIG. 3 shows the call flow for the compiler 12 of FIG. 1. First, at 40, the exemplary C external routine is called, for example, from the parent process 6 which provides a processor( ) shell port. Next, within the exemplary C context, at 42, the routine maintains a program stack of blocks to manage the transient execution of a plurality of child processes, such as 8,38 of FIG. 2B. The stack is employed because a parent process can call a child process, and that child process, in turn, can spawn other child processes using nested calls. As such, the program stack maintains generated block information so that program control can be returned in an orderly manner as child processes terminate, thereby returning to the respective parent processes. Then, after saving any current child process on the internal program stack, a new, unique program shell is created, at 44, to represent the child process. This shell is a program block that is dynamically attached to the calling parent process thorough a block hierarchy. Access to information and passing is through a block structure which wraps the shell.

The exemplary compiler 12 employs a hierarchial programming block structure similar to Pascal, and functions or procedures can contain any number of nested subroutines. While a function declared of a specific type may be used in an object expression (e.g., an equation), the procedures for the compiler 12 actually process an input list to produce an output list. In the compiler 12, this is illustrated in a simple assignment:

(output_list)=process(input_list).

An explicit process input list and an explicit object output list are also employed (as set forth in Example 16 of the Appendix).

Next, at 46, following creation of a unique shell, the source for the child process is parsed, and instructions (e.g., a block series) are loaded into the newly created block associated with the child process. Following the creation of a compiled block of instructions representing the top block of the called child, at 48, the instruction set is NULL terminated. Then, at 50, the child process is executed in a special transient VM which employs a NULL terminated instruction set. This VM specifically checks for a NULL terminated series to provide an explicit return when the child process ends. This provides a return mechanism through the processor( ) shell port 40. The stack is managed to return to the calling transient VM program prior to the return to parent process. Otherwise, the default processor VM is implemented with an infinite loop to speed execution assuming an explicit exit is not provided in the sub-program. Upon return, at 52, the child process shell block is cleaned up. Then, the last child process block is popped, at 54, to allow execution to continue for a transient parent process. Finally, at 56, return is then made to the appropriate parent process.

FIG. 3 is associated with calling external child processes for an external file executed at run time. Here, the call is internal to the compiler 12. Within a source file, this mechanism is not used. Rather, in those instances where, for example, a C routine is wrapped within the compiler 12, a simple shell mechanism is employed.

For the case of the execution of a block of code which was written in C, but included within the language of the compiler 12, as opposed to an external routine written using the compiler 12 itself, as part of step 14 of FIG. 1, a pointer to the C routine for inclusion into the compiler 12 is provided. The name of the C routine, as understood within the compiler 12, as well as the return type is provided along with the parent block (usually the top block) where the routine is to be declared. Then, the initialization routine written to load the compiler 12 kernel creates a block shell, after which a virtual machine instruction is loaded into this shell that will execute the C routine.

The C routine itself is written to accept a single argument (its shell block). From that reference, the C routine may utilize knowledge of the block structure or optional facilities to access pass and return lists. One routine is employed to receive values from the compiler 12, while another routine is used to load values onto the return list to pass back to the compiler 12. Such C routines are common within the compiler 12 and form many of the resident language commands.

Figure 4:
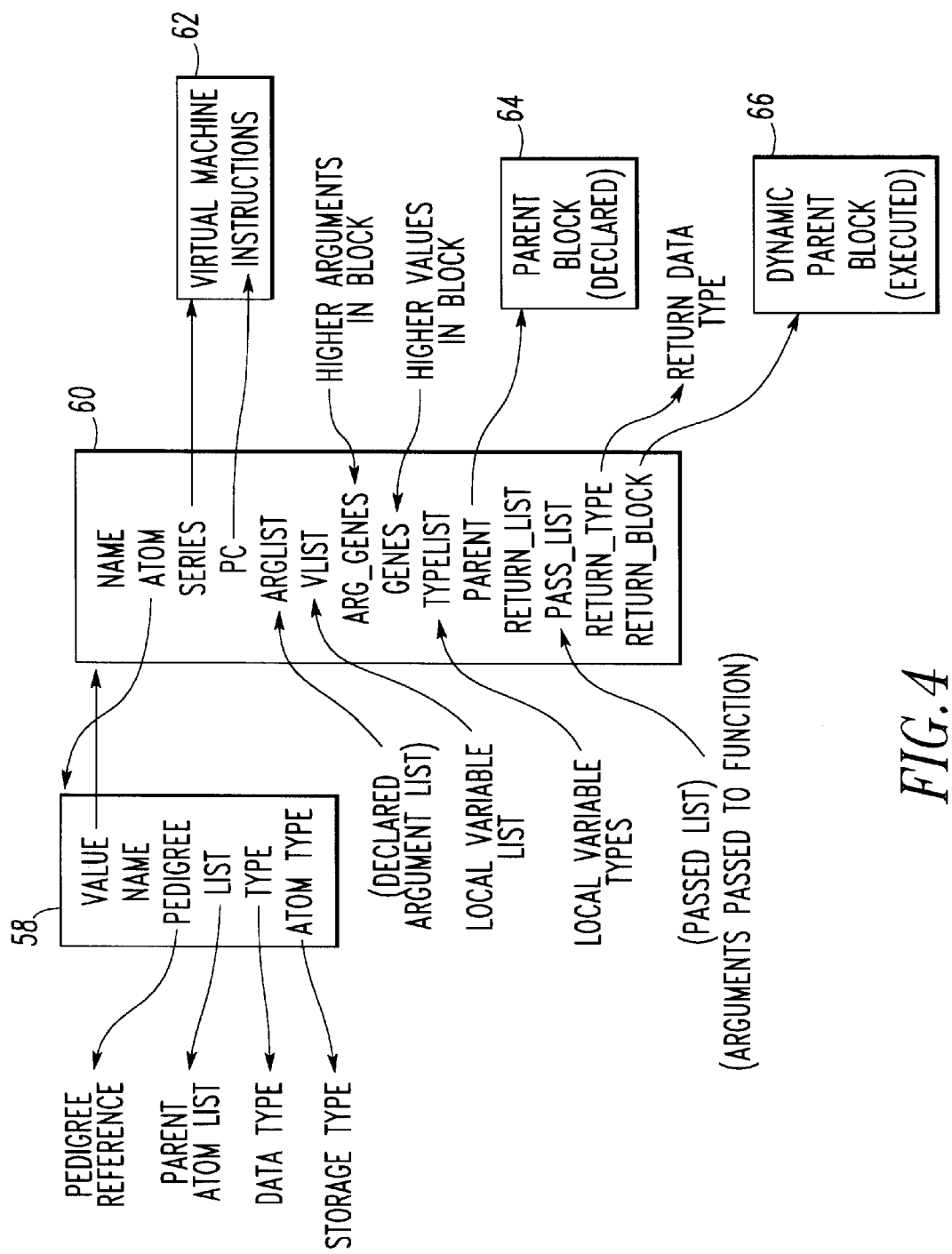
FIG. 4 is a block diagram of memory for a data atom wrapper and an object block in accordance with the invention.

FIG. 4 illustrates the inter-relationship of memory for a data atom wrapper 58 and an object block 60 (e.g., subroutine, child program, procedure, function). Data atom wrappers are the compiled variable objects employed in the compiler 12. The variables themselves are actually wrappers of memory, as opposed to direct symbolic addresses of memory. The data atom concept allows memory to be characterized by pedigree and storage. Furthermore, the information available to the compiled data atom wrapper can be used by an application programmer as a natural extension of the language of the compiler 12. In this manner, the compiler architecture describing the symbol is made available to the application programmer at run time.

As employed herein, a wrapper is an allocation of memory that contains a pointer to data memory as well as one or more descriptive associated data elements relating to such data memory. This includes, but is not limited to, pedigree information, data type information, storage information and data name. The data atom wrapper approach makes it possible to share memory without use of complex signal processing, because the description of memory is provided as a reference within the context of the exemplary virtual machine compiler 12. This provides a linkage with memory that is allocated outside of the compiler 12 (e.g., the application resident compiler (ARC) of FIGS. 7–8).

The compiler 12 language is strongly typed. Base types for objects include, for example, double (e.g., real), long (e.g., integer), string, list, and BLOCK (subroutines and coding). These base types may be included in specialized objects to form more complex groups of data. Instantiation of an object creates a data atom object that wraps allocated memory. The data atom object is an association of allocated memory, name, storage information, data object type information, and data pedigree. Programmers have full access to data atom information.

Examples 2–5, set forth in the Appendix, are written in an exemplary syntax which is similar to C and show applications of the compiler 12. Example 2 shows the processing of data atoms which allows for the processing of unknowns at run time. An array "a" is declared and populated with values. The function "f" will take any passed argument, and if it matches the specified type, "long", print a message. This function will also report on an array and the pedigree of an unknown object passed to the function. The data atom wrapper process is also illustrated by this example. If only the simple value of "a" was provided to "f", access to pedigree, type and array storage information would not be possible.

Examples 3–4 illustrate coding and block values for the compiler 12. Table I shows an example of a block object and its contents for Example 3.

TABLE I

| BLOCK OBJECT | CONTENTS |
|---|---|
| name | "f" |
| series | instructions to process $y = 3*x^2$ |
| arglist | double x |
| vlist | double y |
| arg_genes | none |
| genes | none |
| typelist | none |
| parent | declared parent |
| return_list | (y) |
| return_type | double |
| return_block | calling block | wherein:

name is the name of the procedure;

series is a set of VM instructions (e.g., 62 of FIG. 4) to process as accessed by a program counter (pc) of object block 60;

arglist is a declared list of arguments;

vlist is a local list of variables;

parent is the declared parent procedure (e.g., 64 of FIG. 4);

return_list is a list of arguments to return;

return_type is the type of arguments or data to return; and return_block is the calling block (i.e., dynamic parent block 66 of FIG. 4).

The parent block 64 is the block that contains the declaration of a procedure. This is distinguished from the return block 66, to which execution will return after invocation. The return block 66 is the block in which the subroutine block is called. This may or may not be the same as the parent block 64, in which the procedure itself was declared. In this manner, a return block does not have to be a parent block, but a return block must be either the parent block or one of its progeny in the hierarchial calling tree encompassing the block, or be associated with a block passed explicitly in argument form to a hierarchial ancestor within the calling tree.

Table II shows examples of the contents of three block objects for Example 4:

TABLE II

| BLOCK OBJECT | CONTENTS (add) | CONTENTS (say_hello) | CONTENTS (parent) |
|---|---|---|---|
| name | add | say_hello | parent |
| series | (a + b) | hello assignments | Say_hello, print |
| arglist | *a, *b | y | first |
| vlist | none | none | hello |
| arg_genes | none | first | none |
| genes | none | hello | none |
| typelist | none | none | Hello_Type |
| parent | parent | parent | Top Block |
| return_list | (a + b) | none | none |
| pass_list | (first, "World") | "World" | "Hello" | wherein:

arg_genes are data atom argument objects from parent blocks used within the block child;

genes are data atom objects inherited from parent blocks used within the block child;

typelist is a list of local variable types; and
pass_list is a list of run time passed arguments to the process.

In Example 5 of the Appendix, following a call to the procedure process( ), the objects e,f,g,h and I are passed information from that procedure. The first value on the return list (i.e., e=(x+y)) provides the result of process( ) within a double expression.

For example, by employing the expression:

"z=2.0*process(1.0,1.0);"

z=4.0 shows use of process( ) within a double expression.

In the compiler 12 of FIG. 1, a procedure or function is an actual code block object which acts on data passed to it through an argument pass list. Such a procedure is implemented as an object within a named data atom wrapper, such as 58 of FIG. 4. Furthermore, that procedure has a pedigree (as discussed below in connection with FIGS. 6A–6B), and it acts as a procedural object. The data atom wrapper feature is the key to other features of the compiler 12. The data atom concept and machine construction allows such features as data pedigree (FIGS. 6A–6B), true co-compilation (FIGS. 7–8), atom argument lists (Examples 14–15 set forth in the Appendix), functional objects (Examples 16–18 set forth in the Appendix), and dynamic shell execution (FIG. 10) to be possible. It is believed that the data atom wrapper is unique in that it is a compiled open architectured element.

Figure 5:
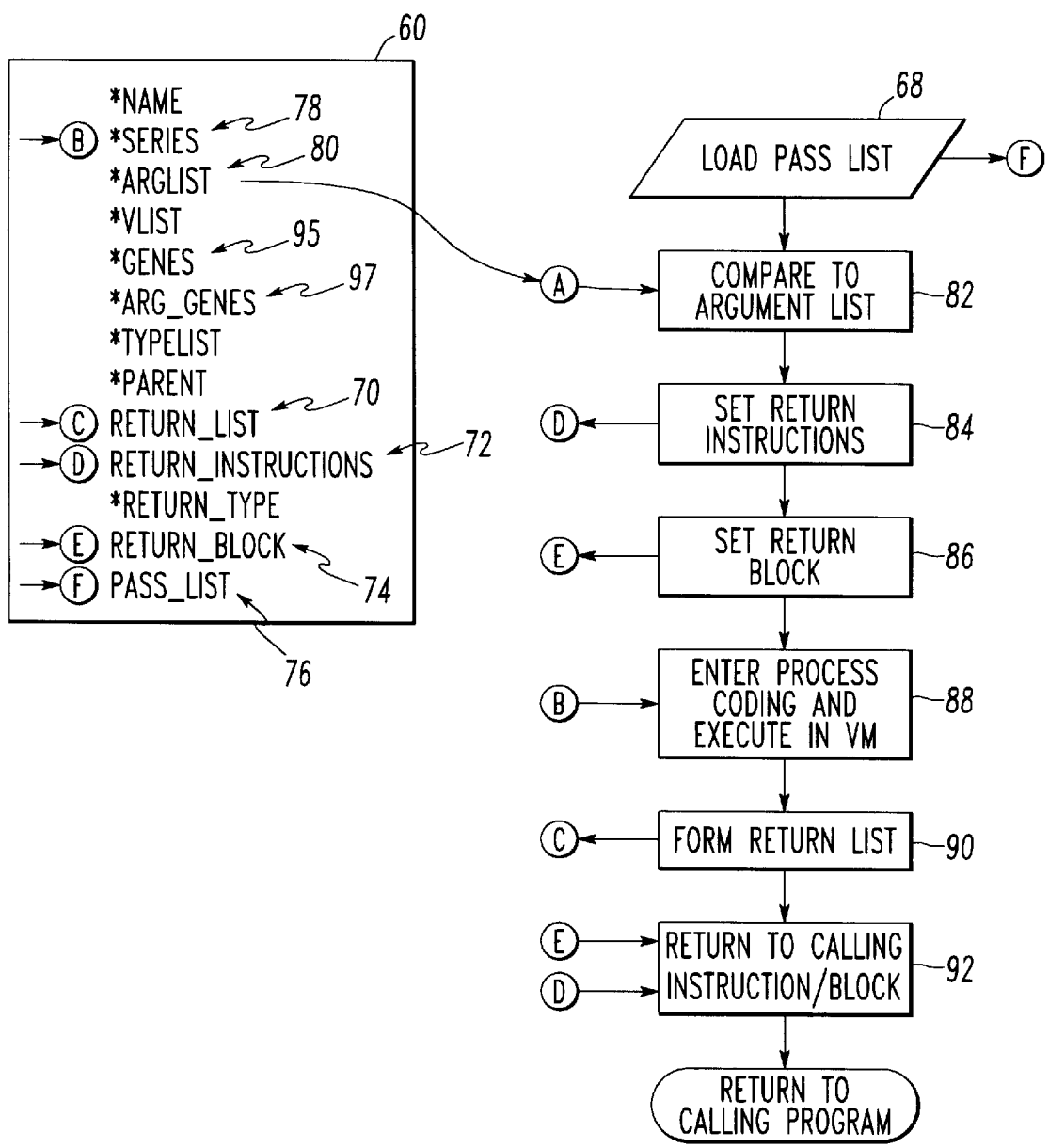
FIG. 5 is a flow chart of run time flow for execution of a program block and the relationship of block memory to execution in accordance with the invention.
Figure 6A:
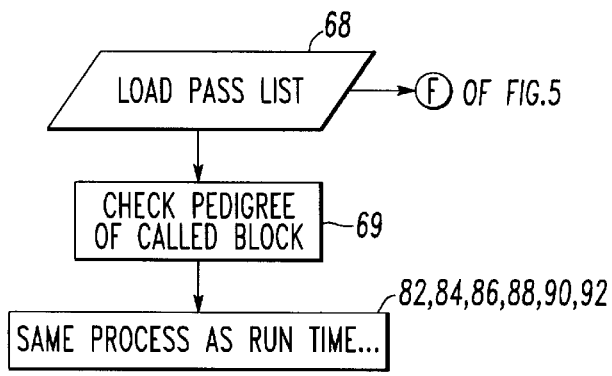
FIG. 6A is a flowchart for the insertion of process pedigree checking in accordance with the invention.

FIG. 5 illustrates run time flow for execution of an exemplary program block (e.g., a program shell as created at 44 of FIG. 3, as well as procedures and functions provided in that example) and the relationship of block memory to execution. In the memory layout of the program object block 60, an asterisk (*) marks those block memory links determined at compile time. This run time process flow does not include pedigree as is discussed below in connection with FIGS. 6A–6B. If the pedigree option is valid, the steps shown in FIG. 6A are inserted after step 68 of FIG. 5.

The arrows (C,D,E,F) between the run time flow and the memory layout indicate the relationship of the flow to the memory information. The elements 70,72,74,76 represent dynamic elements that change during run time. The remaining elements (*), including elements 78,80, represent memory that is established at compile time (see steps 14,18 of FIG. 1).

First, at 68, the call specific object pass list (pass_list 76: objects which are elements of the procedural call, e.g., see Tables I and II) is loaded during the block call in the compiler 12. Next, at 82, the argument list (arglist 80) is compared to the pass list (pass_list 76) which was loaded at 68. Error conditions may occur and require processing (not shown) where the pass list and argument list do not agree at run time. This step loads pass list objects into argument shells. The actual data atoms (see the data atom wrapper 58 of FIG. 4) associated with items being passed, as well as the values being passed, are provided to the arguments.

Next, at 84 and 86, the return instructions (return_instructions 72) and return block (return_block 74) are respectively stored in the dynamic program object block 60. Then, at 88, the process coding program series (i.e., the VM instructions associated with a block) are entered and executed. These instructions make full use of the data atom access features associated with argument data atom shells (arglist) that were loaded (and compared) at step 82. Once the instructions associated with a block come to an explicit return or run their course, any objects on an explicit return( ) are loaded, at 90, into the program block shell (return_list 70). Finally, at 92, control is returned to the calling block (return_block 74) which executes the return instructions (return_instructions 72). In instances of assignment or use with an expression, return objects and values are accessed following this last step. Depending upon the situation, these values may be accessed in total, in part, or be completely ignored. However, these values remain with the program block until invoked again.

Figure 6B:
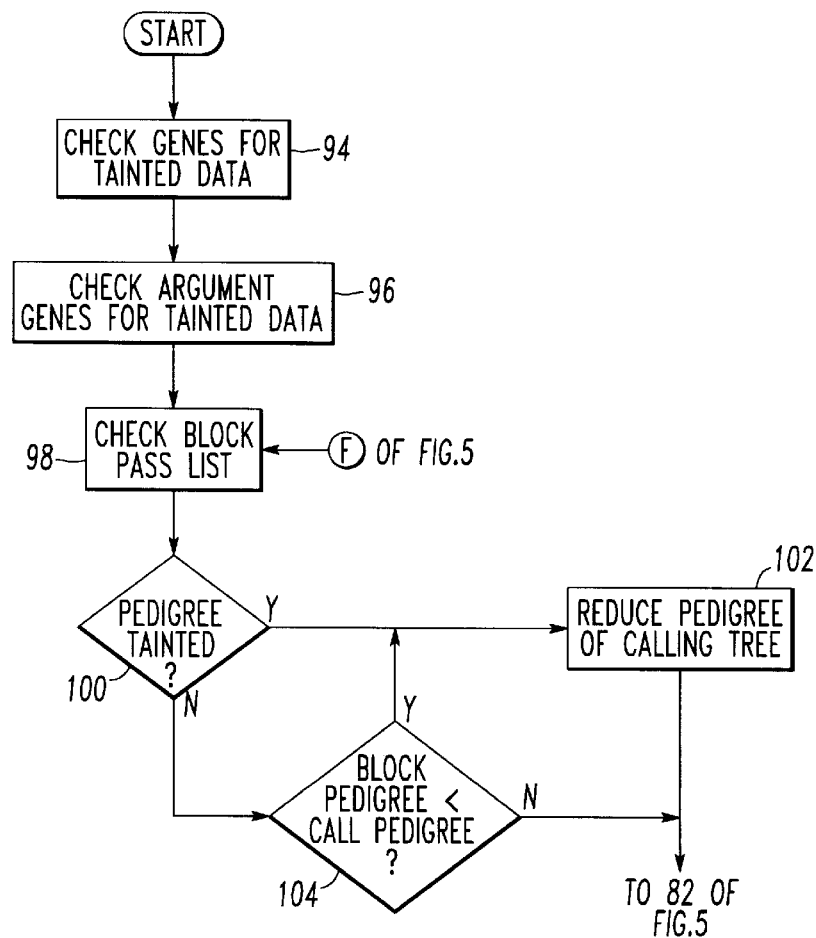
FIG. 6B is a flowchart for pedigree process flow for the compiler of FIG. 1.

FIG. 6A shows the insertion of process pedigree checking and FIG. 6B illustrates the pedigree process flow utilized in the compiler 12. The flow of FIG. 6A is identical to FIG. 5 except that a specific pedigree check, at 69, is performed following the loading of the pass list at 68. It will be appreciated that the pedigree process is exemplary and that other methodologies which may be enfolded into instructions may check pedigree as statements were executed, or may check pedigree prior to block exit by employing a post-statement evaluation technique.

First, at 94, genes (genes 95 of FIG. 5) are checked for tainted pedigree (i.e., a pedigree lower than the current calling block, for example "non-standard" in a "process" pedigreed procedure). Next, at 96, the compiler 12 checks the argument genes (arg_genes 97 of FIG. 5) for tainted pedigree, and then, at 98, checks those elements passed through the pass list (pass_list 76 of FIG. 5). These three blocks (genes 95, arg_genes 97, and pass_list 76) represent direct potential data input to a block. Other blocks executed within a block can affect pedigree, which is handled within the logic of the sub-block itself. Certain native input functions of the compiler 12 have additional pedigree logic for tracing data from external files. These utilize a block shell structure and pedigree logic to enforce pedigree values.

Then, at 100, if the lowest pedigree of those data atoms feeding the current block is less than the current pedigree of that block (i.e., is tainted), then, at 102, the pedigree of the calling tree (i.e., all hierarchial return blocks that are related to the child at run time) is reduced to this lowest level of those three elements. If not, at 104, the pedigree of the current block is compared to the pedigree of the block which called it (i.e., the return block). If the current block pedigree is lower than the call block pedigree, then, at 102, the pedigree of the hierarchial calling tree is reduced to the level of pedigree associated with the current block. Otherwise, the virtual machine continues to process information beginning at step 82 of FIG. 5.

There is a clear distinction between the calling tree parentage and the actual hierarchial parentage of a block. For example, a routine that is a child process of the top program block can be called within a deep run time calling tree (e.g., taking the cosine of a number in a nested block child). Under certain circumstances, this child process may, thus, taint (i.e., reduce) the pedigree of the entire calling tree, not simply the top block parent (e.g., of cosine). Current pedigree tainting extends to dynamic parent processes through the processors port 40 of FIG. 3. In other words, dynamic child processes can taint their parent process' pedigree.

There are three exemplary levels of pedigree in the compiler 12. Pedigree is associated with data and process file storage access and control. In the exemplary compiler 12, UNIX file system attributes are used to control pedigree. Other mechanisms, such as databases, access control lists, or other file management systems may be employed to indicate pedigree of data and script procedural objects.

When the compiler 12 executes, sources of coding and data are tracked automatically. On entrance to a process, sources of input to that process are identified. This includes any objects passed to the process, as well as objects within the hierarchial scope of the process. Additionally, all input procedures of the compiler 12 also trace and check pedigree of input files. If the pedigree of data or code within a process is less than that of the process itself, the compiler reduces the process' pedigree and all related objects in the calling sequence chain.

Example 6, set forth in the Appendix, shows that when the procedure qa_shell( ) is entered, its pedigree is automatically checked. If it is non-standard, then the pedigree report( ) function writes a message to report_stream. Pedigree data atom tags, which include :pedigree.level of Example 6, are shown below in Table III:

TABLE III

| PEDIGREE DATA ATOM TAG | DESCRIPTION |
| --- | --- |
| :pedigree.level | level of pedigree of an object |
| :pedigree.reference | last source file reference for the object |
| :pedigree.stamp | time stamp of the source file for the object |
| :pedigree.number | reference number of the source file for the object |

Using data atom pedigree values, an application programmer can write reports on the pedigree of data and processes as an automated sequence is executing. The application programmer can control the reporting of pedigree information as part of the process flow, producing reports and taking actions within the context of application requirements. The pedigree of data and processes can actually direct the outcome of computational analysis and flow in scripts compiled with the compiler 12.

In C, one can create processes and objects through a symbol table interface and support routines that handle data transfer. Integration of the compiler 12 and application programs can be accomplished by using the compiler 12 as the wrapper for a number of high performance applications that become processes of the compiler 12. However, there is another method of integrating applications and the compiler 12. There are situations where an application calls the compiler 12 as an ARC. In such codes, the compiler 12 can perform input/output (I/O) tasks, manage pedigree, and execute logic within the application algorithm. This gives application users access to a compiler that is intrinsically linked with the application.

Figure 7:
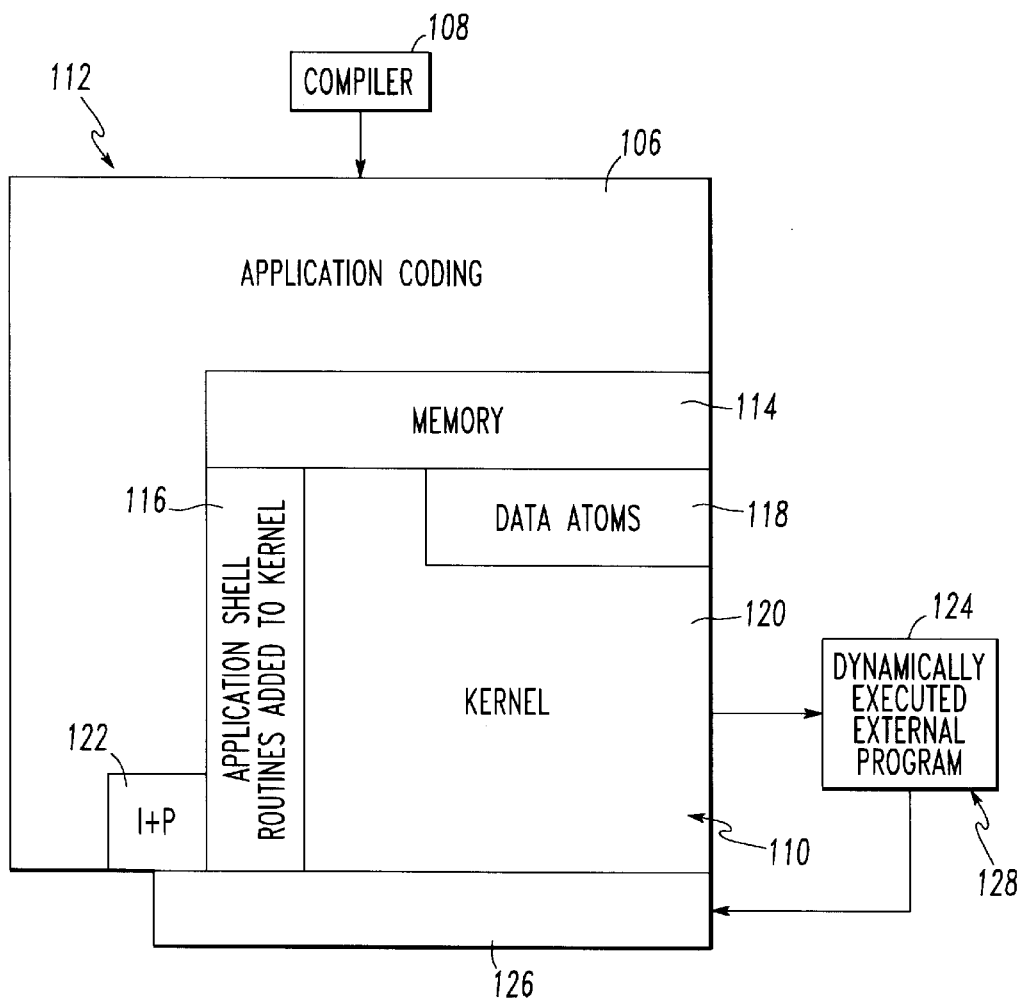
FIG. 7 is a block diagram of memory within an application program that includes the compiler of FIG. 1 when run as an application resident compiler (ARC)

A co-compiler is a language compiler kernel that resides with and is attached to a conventionally compiled language routine. In the compiler 12 of FIG. 1, its object files become a co-compiler with an application process 106 as shown in FIG. 7. In other words, a user can create the application process 106 (e.g., a computer program) using a commercially available compiler 108, which contains a language object kernel 110 of the compiler 12. This, in turn, can be used to provide, for example, an input/output programming interface for the compiler 12.

Continuing to refer to FIG. 7, the general arrangement of memory within an application program 112 that includes the ARC version of the compiler 12 is shown. The application process 106 wraps memory areas 114,116,118,120,122, while the compiler 12 requests memory in areas 124 and 126 from the heap as part of its own process at run time.

With the compiled application process 106, memory area 114 is available to both the kernel 110 of the compiler 12 and the application process 106 which reserves or allocates memory 114. In turn, the ARC compiler 12 accesses this memory 114 though data atoms in memory area 118 which wrap the memory area 114.

Within memory area 116 are application shell routines loaded into the language kernel 110 of the compiler 12. The application process 106 may grant access to these routines for use within scripts of the compiler 12. These routines appear as part of the language of the compiler 12 and allow a user to execute application functions with the compiler 12. In this manner, for example, optional C functions may be employed to extend the kernel 110 of the compiler 12 and provide another method of interface between the application process 106 and the compiler 12.

Memory area 120 includes the kernel 110 of the compiler 12, which is compiled as part of the application process 106. Memory area 122 includes the initialization and program (I+P) pointers of the compiler 12 within the application process 106 used as handles (as discussed below in connection with FIG. 8) to invoke compiled instructions and execute the blocks of the compiler 12 from the external application process 128. Compilation of script programs for the compiler 12 are associated with these pointers.

Memory area 124 includes the external application process 128 of the compiler 12, which is compiled into the memory area 126 for use within the application process 106. Memory area 124 includes the external script that is compiled into heap dynamic memory, and executed using the kernel 110. Memory area 126 is the dynamically managed memory of variables within the compiled program(s) of the compiler 12.

Conceptually, the important point is that the application process 106 contains the ARC compiler 12, and shares memory with such ARC. The application process 106 does not require pipes to communicate with the compiler 12. Furthermore, the access to such shared memory is granted using natural variables compiled as either part of the application 106 or the script program 128. Complex signal techniques are not required to utilize this memory.

Figure 8:
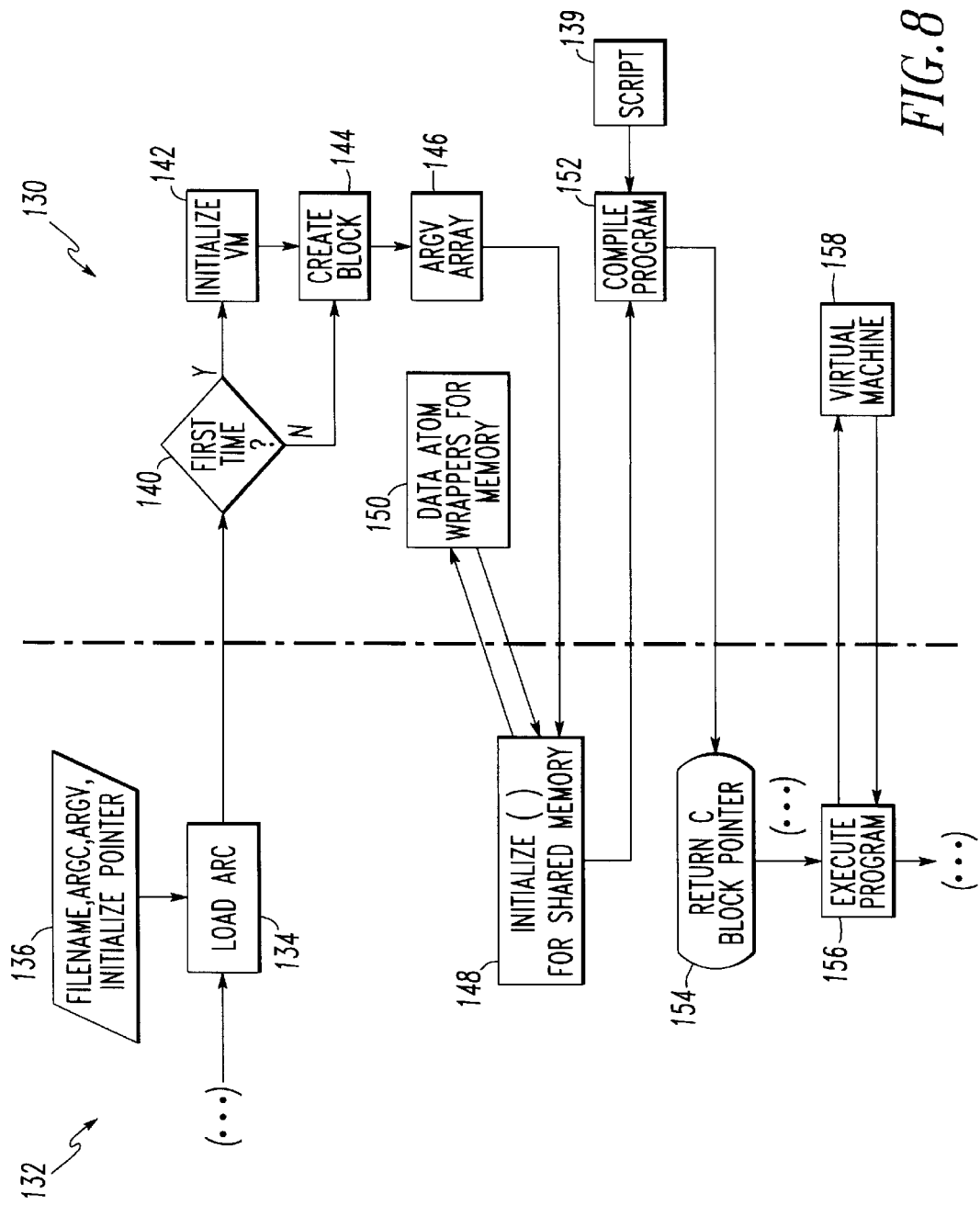
FIG. 8 is a flowchart of the kernel process flow of the ARC compiler of FIG. 7 within an application, with the interface in terms of C calls.

FIG. 8 illustrates the kernel process flow 130 of the ARC compiler 12 (right side of FIG. 8) within an exemplary application process flow 132 (left side of FIG. 8) of the kernel 110 of FIG. 7, with the exemplary interface in terms of C calls. At 134, the application process 106 of FIG. 7 inputs information and sets a specific initialization pointer which points to an application initialize( ) routine that is executed within the kernel 110 prior to script compilation. Additionally, the argc, argv array is passed to this load routine 134 at 136.

After providing the external filename of the script 139, the compiler 12 takes over control. At 140, if the load routine command has been issued for the first time, then the VM is initialized at 142. Next, at 144 (and after step 140 if the load routine command was previously issued), the block is created that will act as the top hierarchial block for the external script program. This block's handle will be returned to the application process 106 for use when invoking a particular compiled script.

Following block creation, at 146, the argv array is created using application supplied data. Normally, the array containing the shell command arguments is used during invocation of the application. Any argc, argv parameters may be provided as arguments from an application for use in the compiler 12 argv array. Typically, actual C argc, argv command line arguments are passed. Next, an initialization( ) function 148 for the memory area 114 of FIG. 7 within the application process 106 is executed. This function 148 employs library routines of the compiler 12 to wrap application memory in data atoms at 150 and may also employ other routines to facilitate the loading of application functions as part of the language of the compiler 12.

Following initialization, control returns to the compiler 12, at 152, for actual compilation of the external script 139.

The script 139 is converted into VM instructions for the compiler 12 kernel. These VM instructions are associated with a unique block created to house the program. At 154, the handle to this block (i.e., the return C block pointer) is returned to the application process 106. Then, at 156, by employing the handle, the application process 106 executes the external script program associated with the returned block pointer by employing the VM 158. Although a specific example of the execute program step 156 is shown, that step may appear anywhere within the exemplary C application by employing the C block pointer handle. Also, other processes can be compiled and associated with blocks as well.

When executing the compiler 12, the application process 106 and the compiler 12 will share all memory wrapped during the initializes function 148, thereby eliminating the need for wasteful pipes. After the execute program step 156, normal application flow continues.

To create an ARC, one must access the object C library of the compiler 12. The object library includes a special cextern.h C language header that has tools to compile and link files. Specific C pointers are associated with compiled procedural objects. These pointers act as handles for the application to initiate external processing calls to the compiler 12.

A special initialization function is used to wrap C instanced memory with data atoms. The language of the compiler 12 and the application process actually share the same memory, with the compiler 12 managing the data atom.

Example 7 of the Appendix shows an exemplary code fragment to illustrate the methodology of integrating a C application with the compiler 12. This example compiles external programs in files "first.extern.processor.file" and "sec.external.processor.file". Within the coding for the compiler 12, the variables a and b would be available as if they were declared explicitly. The memory of a and b are shared with the application process.

In Example 7, the loaded programs are associated with BLOCK_TYP pointers first and second. These handles are used to execute the compiler coding within the application context. Although only one exemplary initialize( ) routine was used, that is not a requirement. Many different initialization routines can be processed for any number of the external programs. The initialize( ) routine created atom variable instances of a and b that are shared between the external programs and the application.

The compiler 12 employs the same memory mapping as its exemplary companion compiler (e.g., a C compiler). An object, declared in the compiler 12, can be mapped to C and vice versa. The advantage of memory sharing over piping and translation is significant.

EXAMPLE 8

As a practical application, a FORTRAN automatic core loading pattern search (ALPS) application was modified to contain an input/output programming interface for the compiler 12. Such application is a computer code which rapidly analyzes nuclear reactor core loading pattern designs (i.e., the placement of nuclear fuel within a nuclear reactor core), and determines the power distribution and other physical characteristics based on a fast neutronics analysis. The FORTRAN compiler used by the prior application was compatible with the exemplary C compiler used with the present input/output programming interface.

Previously, the prior application could only really "optimize" a nuclear core loading pattern based upon a single constraint (e.g., minimizing the maximum power peak in the core). With the integration of the compiler 12, the prior algorithm was modified to swap fuel based upon the number of constraints met using a simple counter flag. The specification of number of constraints met could be programmed by a user, using the present input/output programming interface. The allocated memory containing the application information was wrapped in data atoms for access by the compiler 12.

Based upon the physics information shared between the compiled ALPS application, and user coding input to the compiler 12, literally any single or multiple groups of constraints could be utilized to optimize a loading pattern using this new version of ALPS. Where before an optimization was restricted to peaking factor, now thermal hydraulics, peak pin, assembly location and numerous other practical design constraints may be advantageously incorporated into ALPS.

Example 9, set forth in the Appendix, shows how memory is wrapped in a data atom using a C application compiler.

Example 10, set forth in the Appendix, is a more generic example of a simple root finding scheme. In mathematics, the Newton-Raphson method is a simple algorithm for finding a root of a function based upon its function value and the derivative of the function (see the upper portion of Example 10). The problem with such a method, is that a mathematical function must be compiled with a root finding routine, and the function must be specified at compile time. Alternatively, one might write a Perl routine, or Tcl/Tk script, using a data piping methodology to connect the compiled application with a programmable interface.

However, by employing the compiler 12, a user may compile a commercial root finding code with the co-compiler kernel 110 of the compiler 12 in place. The user may then input the function, and a compiled application would be able to process the results.

For example, given inputs of:

$fx = x^2 + 5*x + 6.0;$ /*Function $fx = x^2 + 5x + 6$*/

$gx = 2*x + 5;$ /*Derivative $gx = 2x + 5$*/ the user can obtain the resulting roots of f(x) of -3 and -2 using an application which could use formula input (see the lower portion of Example 10).

While such an application is possible with other languages, the ability to wrap memory and provide a true co-compiler, in which variables x, fx and gx are shared between the compiler 12 and the compiled application process, but not data piped, is believed to be a unique feature and, thus, a potential advantage. With the compiler 12, the ability to process the above equations is theoretically many times faster than data piping required in other languages available, such as Tcl/Tk and Perl.

Figure 9:
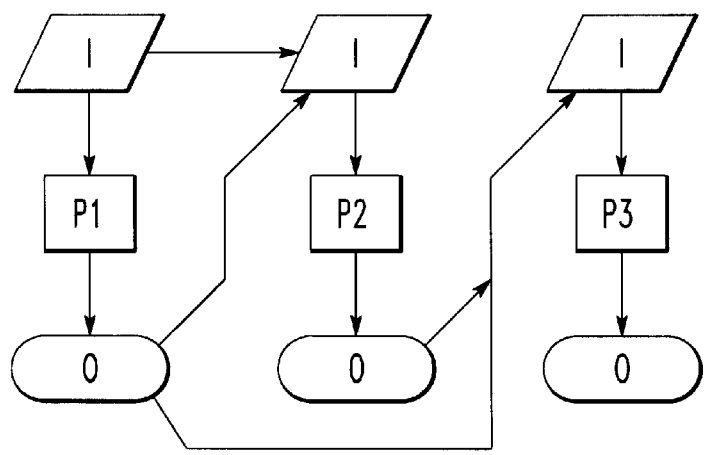
FIG. 9 is a block diagram of three independent processes in sequence that share common input and output data in accordance with the invention.

FIG. 9 illustrates an example integration problem with three processes P1,P2,P3 in sequence that share some common input (I) and output (O) data. Problems of this type are the essence of batch integration and automation. These independent processes P1,P2,P3 share certain inputs and outputs and, more importantly, share the pedigree of those processes and data. These processes P1,P2,P3 flow sequentially. Further examples are shown with Examples 11–13.

Example 11 of the Appendix, shows the creation of a generic input/process/output machine in the compiler 12. This example illustrates the loading of a general input/output integrator. Object lists of ingredients as inputs and outputs are combined with step by step processes to have a virtual birthday party. Processes can share data, and the outputs of one process can feed a trailing process. Many natural shell integration problems are of a form that can be thought of and cast in this exemplary cookbook manner.

Example 11 suggests creation of a process object to encapsulate the basic input, process and output machinery. Such objects could then be passed to a generic processor, similar to the one programmed in this example. In the compiler 12, objects of a specific type can be created and used to encapsulate both code and data. An exemplary code fragment to declare an object type is presented below:

```
object process_typ
    {    list input;          /* Input list */
         list output;         /* Output list */
         list process;        /* List to attach a process */
    };
```

Example 12, set forth in the Appendix, shows an exemplary program fragment written in the compiler 12 which provides a generic type switch. This example illustrates a complex switching algorithm. Comparing the :type of the first input variable to others passed to the switch, the appropriate process is executed. The Generic_Type_Switch( ) procedure then returns with the output list of the selected process attached as the return list of the Generic_Type_Switch( ) procedure.

In programming, one sometimes comes across problems where a function follows a particular form, but contains differing internal statements. In C, for example, a preprocessor is used to create macro language extensions to reduce coding. In the compiler 12, one can use Procedure Object Programming Style (POPS) techniques to create true shell routines as shown by Example 13 of the Appendix. In this example, standard automatic report writing consists of executing a number of batch processes, summarizing results, and composing a report. There is a known form for the output data and the processes. The form of the report is also known; however, summarizing results can be quite specific. The application programmer for write_report( ) provides a procedure, report_summary( ), which accepts the outputs from batch processes and produces a result of data type.

In turn, other application programmers, using write_report( ) of Example 13, know that the first argument to report_summary( ) must be a list of batch process outputs and, also, that report_summary( ) must produce a data type output. However, the programmers can write a highly specialized summary program to fit into the write_reports( ) shell. The specific summaries need not be envisioned by the original application programmer. This contrasts with Object Oriented Programming's VM inheritance, where such problems are solved using common object hierarchy and methods. The POPS technique provides template forms where procedures are naturally inserted.

Numerous computer languages and compilers use a block hierarchial structure. In most compilers, these are name mangled entities, which appear in the language, but are implemented through symbolic translation using a stack machine approach to pass information to and from a function. In the compiler 12, however, declared procedural/functional blocks are actual object entities which are wrapped in data atoms. These can be passed to and from other blocks of code, and argument lists passed to and from functions can be accessed and retained at various times. This form of programming is referred to herein as POPS. This concept allows functions to obtain information to execute at different times, and can allow functions to perform in a similar manner to conventional objects in Object Oriented Programming (OOP) (i.e., the method of associating methods with specific data types).

This is important when considering process pedigree. Higher pedigreed processes or applications such as write_report( ), serve as wrappers for coding. In a highly regulated industry, to re-configure and test computer codes for the sake of specialized processes is expensive. With the POPS technique, one can create true shell wrappers that contain customized components. The compiler 12 automatically tracks pedigree (as discussed above in connection with FIGS. 6A–6B).

Furthermore, the ability to test on object type, take action, create variable argument procedural objects, and pass them, provides significant tools for batch automation. A further aspect of the compiler 12 is the free extension of this capability to the execution of dynamic child processes.

Conventional lists of values are created in languages, such as LISP, using symbolic memory elements. A list of items or symbols point to actual instantiations of memory. The compiler 12 lists employed in associations of memory, as well as function argument passing, are actual data atom wrappers. As such, pedigree, storage information and type are available to the data atom list.

Examples 14–15, set forth in the Appendix, show list operation and usage. In addition to passing lists to functions as shown in Example 14, functions in the compiler 12 actually return data atom lists as shown in Example 15. This feature, of multiple returns and list returns from a function, is believed to be a unique feature of the compiler 12. The value of this unique feature will be made more apparent when discussing parent/child run time system processing in connection with FIG. 10.

Many practical applications are possible using the POPS technique of block/object approach in concert with the data atom wrapper. The combination of conventional OOP style available in the compiler 12, with data object lists of unspecified type, creates an extremely powerful and unique language feature.

While function passing is permitted in other languages with variable arguments, and block hierarchial coding is also available, in the compiler 12, the compilation of a literal object block provides a unique capability to extend language characteristics in dynamic directions which are fundamentally different from those of other programming languages. The ability to retain return information in a functional object means that one can use the function itself as a return name for data, eliminating the need to declare extra variables. The ability to pass arguments at different times provides a mechanism whereby coding of a particular argument list form can be passed and preloaded with data.

In C, for example, while function passing is permitted, the form of the argument list is dictated in compile time declarations. In the compiler 12, the form of function arguments is open, and components in passing lists themselves can be changed. This provides a mechanism by which a fixed function can obtain completely external as well as dynamic information, and branch or execute in accordance with an external functional block.

In most every other computer language, a function is a code entrance which passes information back and forth using a stack machine approach. In the compiler 12, the object block contains a reference to a pass list attached at run time, an argument list defined at compile time to which such attachment is compared, and a return list which is attached at run time. This inherent object structure for a function allows it to behave as an object with data attached dynamically. Moreover, it allows an application programmer the ability to create functional objects which can act in a specified manner and sequence on externally provided data of a general form which is unknown at compile time.

Figure 10:
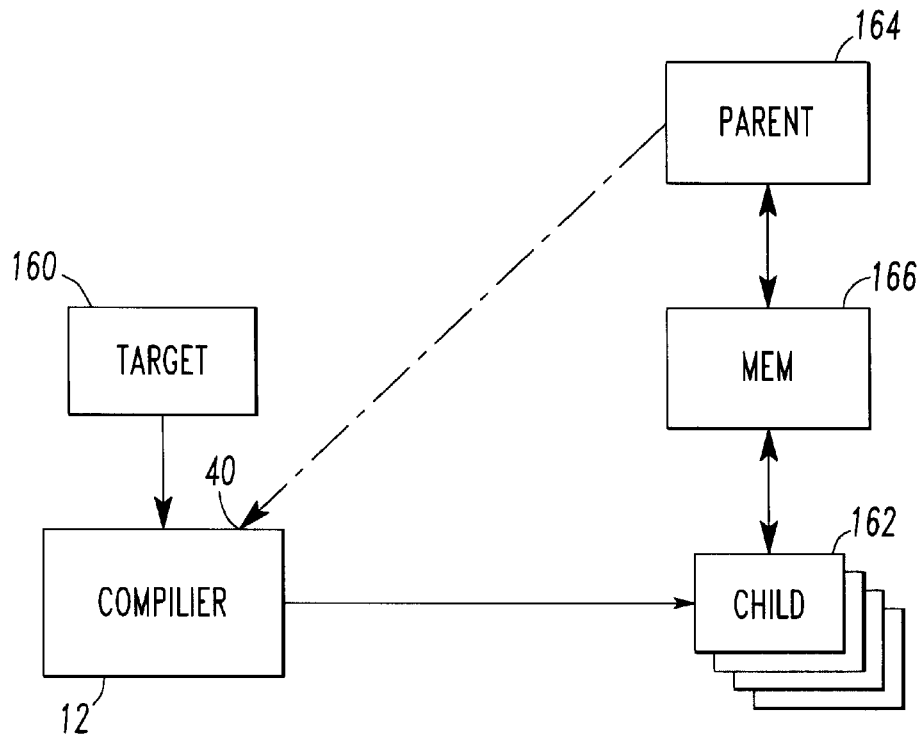
FIG. 10 is a flowchart which shows dynamic shell execution.

Referring to FIG. 10, in the compiler 12, a plurality of child processes can be executed through the processors port 40 of FIG. 3. This implementation executes a compile on a target program 160. When executed, the dynamic process child 162 has complete access to information of the parent process 164 through memory area (MEM) 166, and vice versa. While the compiler 12 is a standalone compiler, it is also designed to run itself dynamically. That is, the compiler 12 can run like a shell, running other UNIX applications through a system command, or running itself through the processor( ) port 40.

When the compiler 12 executes a child program dynamically, it can run a script which may have been created using a dynamic, run time process. The parent spawns children which inherit all of the hierarchial block coding within the scope of the processor( ) function call. Additionally, the parent can receive back from the child objects available on the processor( ) return list.

In standard UNIX shells, strings are passed from parent to child, and parent processes know very little about their children and the children have a limited interface with the parent processes, as only strings are passed to children directly from parent process shells.

In the compiler 12, a child process has access to all block information available to the parent through the processor( ) port. This information is accessible through the processor.list. In a similar fashion, a child can provide a return list to the calling parent. The information passed is any valid object (e.g., a specifically declared data object, a series of functions or lists). The child has complete access to this information, and can change values in accordance with block hierarchial rules as if the program was included into the source.

In this manner, a sophisticated routine can branch, executing numerous optional child processes without including the child process code at compile time. The compiler 12 processes the children, and returns control to the calling parent automatically. Any number of child processes can proceed from a parent. In Example 16 of the Appendix, the program will execute the program contained in the file at run time, and compile it automatically depending upon the value of the choice flag. The compiler 12 executes through the processor( ) functional command, which allows the passing of object data to and from the dynamically executed and compiled child.

Within the child program of Example 16, one can obtain and assign information using the processor.list syntax, checking, e.g., for proper type, pedigree. In the compiler 12, a list is an associated set of objects. This includes arguments passed to a procedure or function. In the compiler 12, lists can be operated upon as separate entities. The list elements are unknowns at compile time. Each unknown is accessible by its position in the list.

Example 17, as set forth in the Appendix, shows how a list is formed and used. In this example, a procedure of the compiler 12 called process( ) is loaded with unknowns through a list. The process( ) input list is accessed as process.list, with switching performed using an unknown variable arguments :type, as there is no formal argument list for the procedure process( ). In this example, the application programmer is given sufficient information to handle object and storage types through data atom access. The application programmer assures that unknown object types meet expectations using the :type tag.

As an alternative, as shown in Example 18 of the Appendix, one could process all information on a list and pass it in a different form.

As demonstrated in Examples 16–18, the positions on the list are accessed as array elements. Assignment statements and logical comparison expressions are possible for unknowns. Also, all procedures within the compiler 12 are inherently variable argument routines. The real power of the object lists of the compiler 12 is that they can be passed to and from processes. A procedure's input list can always be accessed directly for situations where more general input is required.

Procedural objects can be loaded, then executed at different times. This provides a mechanism for loading procedural objects, passing them to subroutines, and executing them with partial input lists. Generic process engines that can act on objects of various types, can be composed to provide interfaces between object types.

EXAMPLE 19

For example, consider the following code fragment:

(x,y,z)=processor("another_processor_program.tul",a,b,c);

In this example, the parent compiled processor( ) routine executes a child program located in the file "another_processor_program.tul". Within the child program, variable input list objects passed from the parent as a,b,c are accessible in the child through processor.list[1] through processor.list[3] (processor.list[0] is the file name). The objects a,b,c can be any object type, including procedures and functions that compiled in the parent. The dynamically executed child will return objects x,y,z. These objects are provided values based on dynamic execution of the child processes. The (input)=process(output) POPS technique is maintained, with arguments passed to the child compilation through processor.list.

One of the interesting aspects of the compiler 12 in this context, is the creation of a program to write programs. A dynamically created child program can share data with the parent which wrote and executed it.

To facilitate such processes, the compiler 12 language is fully integrated with a companion macro language. This gives an application programmer tools to create powerful scripts that directly interact with parent processes.

The exemplary compiler 12 allows, for example, a simple integration of nuclear core engineering legacy batch coding for development of a reload safety analysis checklist, automation of nuclear reactor reload analysis, automation of engineering safety analysis calculations, and other safety related computer code integration tasks. This includes batch code input, execution, and final calculation note production. The entire safety analysis for nuclear reactor core design can be automated. Using the compiler 12, a nuclear engineer can provide numerous parameters used to optimize nuclear core designs. The design constraints can include fuel rod design, radiation shielding, mechanical design, thermal hydraulic design and fuel cycle economics.

Pedigree tracking is instrumental in assuring proper processes are used for nuclear core safety analysis. For example, based on the need to automate much of the verification process to meet nuclear fuel cycle time reduction goals, the compiler 12 tracks the pedigree of both processes and data objects at run time. Engineers can customize work as necessary, and verifiers can review the impact of those changes using the compiler 12.

Much of the capability of the compiler 12 is generic in nature, and has commercial value in applications outside of the nuclear industry.

Data pedigree tracking capability could be somewhat mimicked with other interpreters, such as Perl and Tcl/Tk, to a very limited extent. However, other interpreters require a data pipe to move information back and forth between the interpreter and the application. Such a process is computationally expensive compared to the exemplary compiler 12 which shares memory and compiles user input during application run time.

Furthermore, the compiler 12 is a true co-compiler. It utilizes and manipulates the same memory used by the application, eliminating the need for data piping and conversion. The uniqueness of this feature provides a significant commercial advantage, because, for example, nuclear core optimization routines demand speed as well as flexibility.

With the compiler 12, whole objects, programs and function block routines can be dynamically passed and managed using the parent processes. Children can communicate directly with parents. Additionally, the compiler 12 can actually dynamically write scripts which it can then execute. A parent process can dynamically create a child from which it can receive information, and interact normally.

With the compiler 12, the data atom wrapper allows for an inherent sharing of memory without employing complex and expensive programming techniques such as data-piping. The compiler 12 may be employed to improve computer process automation. The compiler language introduces a unique POPS technique that compliments strongly typed OOP with what is believed to be novel object processing. The compiler 12 automates verification of customizable process components which has broad application for engineering in highly regulated industries (e.g., the nuclear industry). Other language features, such as procedural objects, object inter-process communication, and variable input/output lists significantly advance the automation of engineering analyses (e.g., automating nuclear reactor design safety analysis or the design of nuclear reactor cores).

The exemplary compiler 12 has a direct link to C which provides a practical method of extending the compiler language or incorporating the language kernel into C compatible applications. The compiler 12 can call itself at run time, passing objects from parent to child processes, and from child to parent processes.

It will be appreciated that the mechanisms of the present invention are capable of being distributed as a program product in a variety of forms, and that the present invention applies equally regardless of the signal bearing media used to actually carry out the distribution. Examples of signal bearing media include recordable type media, such as floppy disks, CD ROMs and other disks; and transmission type media, such as digital and analog communication links.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

- 30 -                                              ARF 98-04

APPENDIX

Example 1

```
#pedigree      /* Turn on compiler pedigree tracking */
y = 4;         /* Simple data types are declared and initialized automatically */
long a[y];     /* An array of 'y' long values.  Dynamic arrays are encouraged
                  in the compiler 12. */ for (j=0;      /* C like syntax is used in compiler 12, including for loops */
     j<a:nitems;    /* The array atom 'a' can access the number of items
                       stored as 'a:nitems' */
     j++)
    a[j] = 10;  /* Data atom object 'a' compiled as a normal array variable */ proc process(long * b[])    /* Pass a long array by reference - no pointers
                               are needed in the compiler 12 */
{ if (b:type == long)       /* Type checking for objects is also possible */
    print(stdout,"Of course 'b' is of type %s\n",typename((b:type)));

if (b:pedigree.level < CONTROLLED)      /* Pedigree information */
    pedigree_report(stderr,b);

resize b[(b:nitems + 3)];    /* Add three more elements to b */
} process(a);    /* a will be resized automatically */
```

Example 2

```
long a[5];     /*Declaration of an array, a, of 5 members */ for (I=0;
     I<a:nitems;   /*The compiled size is known to the user, a:nitems*/
     I++)
    a[I]=a:type:   /*The object type is available to the user, a:type */

/*Declare a procedure*/ proc f()
{if(f.list[0]:type==long) print(stdout,"Eureka");
 if(f.list[0]:nitems>0) print(stdout,"I know its an array too\n");
 print(stdout,"Pedigree Report%s\n",(pedigree_report(f.list[0]:pedigree)));
} f(a);          /*This feature allows for variable arguments functions with unknown
                  types passed as arguments, allowing functions to act on data based upon
                  its type.*/
```

Example 3

```
double f (double x)
    {double y;
     y=3*x²;
     return (y);
    }
```

Example 4

```
proc parent(string first)
      {object Hello_Type
        {string h;
         string w;
         string m;
        }hello;      /*Hello Type object instance 'hello'*/
       string add (string*a, string*b)
            {return((a+b));}
       proc say_hello (string y)
            {hello.h=first;
             hello.y=y;
             hello.m=add(first,y);
            }
       say_hello ("World");
       print (stdout,"%s",hello.m);
      }
parent("Hello");     /*Execute*"
```

Example 5

```
double process(double x, double y)
  {
     return((x+y),(x-y),(x*y),(x/y),(x^y));  /* Return plural calculations to a
                                                list */
  } double e,f,g,h,I;

(e,f,g,h,I) = process(pi,2.0);
```

Example 6

```
procedure qa_shell()
  {
      if (qa_shell:pedigree.level < PROCESS)
           pedigree_report(report_stream,qa_shell);   /* Process Itself */
           .
           .  /* Other coding within this controlled process */
           .
  }
```

- 32 -                                                                                          ARF 98-04

Example 7

```
include <cextern.h>      /* compiler 12/C connection */ long    a;                /* C instantiation to share with compiler 12 */
double  b[3];             /* C array instantiation to be shared with compiler 12 */

/* Special initialization function to wrap C memory with compiler 12 data atoms */
void *initialize(BLOCK_TYP *blk)
   {  cextern_atom_shell(blk->vlist,"long","a",&a);          /* Wrap/Share a
                                                                 value */
      cextern_atom_1d_shell(blk->vlist,"double","b",3,0,2,(void *) b);
                                                             /* Wrap/Share b
                                                                array */
   } void main(int argc, char **argv)
  { BLOCK_TYP *first, *second, *inside;

/* Compile programs sharing memory of 'a' and 'b' through initialize() */
       first=cextern_processor_load("first.external.processor.file",argc,argv,initialize);
       second=cextern_processor_load("sec.external.processor.file",argc,argv,initialize);

/* find a specific compiler 12 subroutine within the 'first' block */
      inside = cextern_find_named_blk("inside_first_subroutine",first);

/* Execute these external programs as demonstration */
      cextern_execute_blk(first,NULL);
      cextern_execute_blk(second,NULL);
      if (inside)
          while (a) cextern_execute_blk(inside,NULL);    /* 'a' better change in
                                                            'inside' */
  }
```

ARF 98-04

Example 9

/*C coding example of wrapping data in an atom to share with the compiler 12*/ cextern_atom_shell(blk->vlist,"long","ndim",(void*) ni);

/* wherein:
    blk          is a block passed to the initialization routine,
    vlist         is the variable list associated with the coding block,
    "long"       is the equivalent type in the C language,
    "ndim"      is the data atom name in the compiler 12, and
    (void*) ni  is a pointer to the memory mapped as "ndim" in the compiler 12, and ni in the application process The above routine, within the exemplary C alpsvar_initialize() application subroutine set forth below, wraps data memory using a data atom*/ x_blk = cextern_processor_load("alps.tul",0,NULL,alpsvar_initialize);

/* wherein:
    x_blk               is a reference to the top code block in C,
    "alps.tul"         is the name of the input to load into the application,
    0, NULL           are optional argc, argv arrays for use in the compiler 12, and
    alpsvar_initialize()  is a pointer to a C function where data memory is wrapped (cextern_atom_shell())

The above code compiles the "alps.tul" file using the compiler 12 co-compiler kernel included in the application code.*/ cextern_execute_block(x_blk,NULL);

/* The above code executes the compiled compiler 12 routine pointed to by x_blk, providing a NULL input argument list of the coding block.*/

- 34 - ARF 98-04
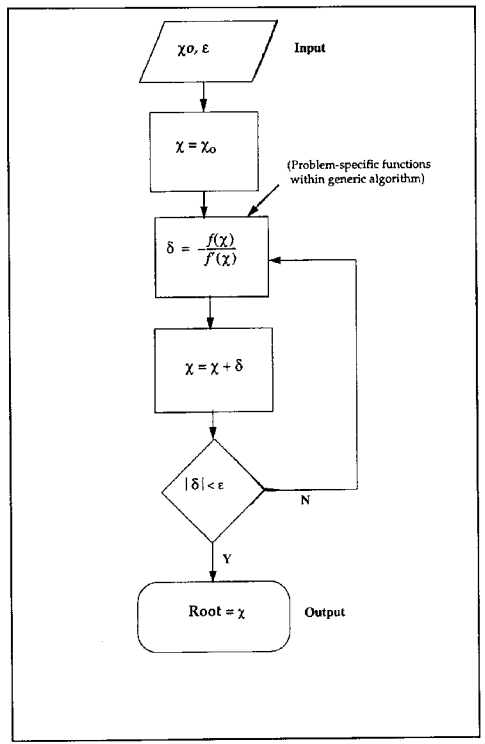
Example 10
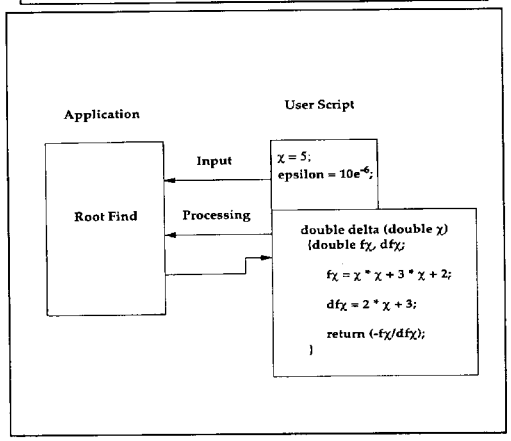

- 35 -                                                                       ARF 98-04

Example 11

/* Generic_Processor(Input List, Procedure, Output List ...): A variable arguments routine that sequentially executes conventional processes in a generic form. Input and output lists are provided with objects that are loaded into procedures, as defined by an application user.*/

```
proc Generic_Processor()
    {long input, process, output;        /* Variable arguments indices */ for (input = 0; input < Generic_Processor.list:nitems; input = input + 3)
        {process = input + 1;            /* Second Object */
        output   = process + 1;          /* Third Object */ if ((Generic_Processor.list[input]:type == list) &&      /* Check inputs */
            (Generic_Processor.list[output]:type == list) &&
            (Generic_Process.list[process]:type == BLOCK))       /* proc/Function types = BLOCK */
            {                            /* Load a procedure with input */
                Generic_Processor.list[process] : Generic_Processor.list[input];
                /* Execute, passing output to a list */
                Generic_Processor.list[output] = Generic_Processor.list[process]();
            }
        else error_routine(Generic_Processor.list,input,output,process);
                                         /* Handle error */
        }
    }

/* Bake a cake example */ list cake_ingredients, cake_products,
     icing_ingredients, icing_leftovers,
     birthday_ingredients, birthday_leftovers;      /* Ingredients object lists */ list bake_cake(*), ice_cake(*), throw_party(*);    /* process object prototypes */

/* Objects such as eggs, milk, flour etc... and their types declared
       elsewhere */
cake_ingredients    = (eggs,milk,flour,sugar,bakingsoda);
cake_products       = (cake,eggs,milk,flour,sugar);   /* Left overs are output */
icing_ingredients   = (eggs,milk,sugar,chocolate);    /* Use some leftovers */
icing_leftovers     = (cake,icing);
birthday_ingredients = (cake,candles,guests,Champagne);
birthday_leftovers  = (cake,candles,guests);
```

- 36 -                                                         ARF 98-04

```
/* Bake a birthday cake using three processes */
Generic_Processor(cake_ingredients, bake_cake, cake_products,
                  icing_ingredients, ice_cake, icing_leftovers,
                  birthday_ingredients, throw_party, birthday_leftovers);
```

Example 12

```
/*  Branch execution based on unknown argument type, and return: The first
    argument passed is used for switching.  The following arguments in pairs
    represent (type,action).  Type is the comparison type to the first argument, and
    action is the procedure to be executed.*/ proc Generic_Type_Switch()
   {long value_type;                      /* First argument passed type */ value_type = Generic_Type_Switch.list[0];        /* Assign type */
   for (j=1; j<Generic_Type_Switch.list:nitems; j=j+2)
      {jp1 = j + 1;                       /* Index for action */
                                          /* Compare first type with
                                             list type */
      if (Generic_Type_Switch.list[j]:type == value_type)
         {                                /* Match found, load action
                                             with first argument */
         Generic_Type_Switch[jp1] : (Generic_Type_Switch.list[0]);
                        /* Execute action, load Generic_Type_Switch() output list
                           and return from function */
         Generic_Type_Switch.return : Generic_Type_Switch.list[jp1]();
         }
      }
   }

/* Make use of switching routine in a procedural object called foo */
proc foo()
   {  list process_double(*),       /* Prototype actions programmed in foo() */
           process_string(*),
           process_list(*),
           process_myobject(*);

for (j=0; j<foo.list:nitems; j++)
         Generic_Type_Switch(foo.list[j],double,process_double,
                                         string,process_string,
                                         list,process_list,
                                         myobject,process_myobject);
         .
         .          /* Detailed coding for prototyped processes */
         .
   }
```

Example 13

```
/*    report generator following execution of a number of batch processes */ procedure write_report(list batch_processes,form report_form,data report_summary(*))
  { list batch_outputs;
    data summary_data;

batch_outputs    = Generic_Processor(batch_processes);   /* Execute Batch
                                                                codes */
    (summary_data) = report_summary(batch_outputs);  /* Execute  specialized
                                                        summary */
    expand(report_form,summary_data);                /* write a report based on
                                                        form and data */
  } summary(*,specialized_data, specialized_code);   /* Pre-load part procedural object
                                                    */
write_report(processes,my_form,summary);         /* Write report based on summary
                                                    */
```

Example 14

```
list a;
long f(*);                /*Prototype a function*/ a = (obj1,obj2,*,obj3);   /*Place object atoms into list*/ f:a;                      /*Load function f with list, but do not execute*/
f(*,*,x);                 /*Execute a function using keyhole (i.e., the merging of
                            an argument list, defined in a procedure, and a passed
                            list during a function call form a keyhole and key, with
                            the keyhole being the form demanded by the argument
                            list procedure declaration, and the key being the actual
                            passed list or series of overlapping lists forming the key)
                            methodology*/ long f()
{my_object_type q;

for (I=0; I<f.list:nitems; I++)           /*Lists passed to functions are
                                                 accessible*/
        if (f.list[I]:type==my_object_type)   /*Test atom object type*/
            {q = f.list[I];                   /*Assign list to a normal atom*/
             g(q);                            /*Execute some other function*/
            }
}
```

ARF 98-04

Example 15

```
long f()
  {return(1,2);}

(a,b) = f();
```

Example 16

```
long choice;

/*More code where other parameters and choices are developed*/ if (choice) (a,b,c) = processor("true.program.tul",x,y,z);
else (a,b,c) = processor("false.program.tul",q);
```

Example 17

```
long a[y],b[x];                 /* A couple of arrays */ myobject_typ q;                 /* Some other object defined in the
                                   application */ list   mylist,
       process(*);              /* A Prototype of process, a '*' is
                                   an empty space */ mylist = (a,*,b,q);             /* A list of objects is associated with
                                   mylist */ for (j=0; j<mylist:nitems; j++)  /* Loop over list */
    process((mylist[j]));

proc process()

{   /* Sub procedures can be declared within a procedure in the
           compiler 12 */
        proc print_long_array(long * x[])
            { print(stdout,"%s = ",(print_long_array.list[0]:name));

/* Original object name (a or b) */
              for (k=0; k<x:nitems; k++)
                  print(stdout,"%ld ",x[k]);
              print(stdout,"\n");
            } if ((process.list[0]:type == long) &&
            (process.list[0]:ndim == 1)) print_long_array(process.list[0]);
    }
```

Example 18

```
my_list = (a,b,q);

process:mylist;      /* Load mylist into procedural object 'process' */
process();           /* Execute the procedural object 'process' with mylist */ proc process()
      { /* Sub procedures within a procedure in the compiler 12 */
            proc print_long_array(long * x[])
              { print(stdout,"%s = ",(print_long_array.list[0]:name));   /* Original
                                                                            object name
                                                                            (a or b) */
                  for (k=0; k<x:nitems; k++)
                      print(stdout,"%ld ",x[k]);
                print(stdout,"\n");
              } for (j=0; j<process.list:nitems; j++)  /* Loop over process list elements */
      if ((process.list[j]:type == (long)) &&
          process.list[j]:ndim == 1)) print_long_array(process.list[j]);
}
```

What is claimed is:

1. A computer apparatus comprising:
a central processing unit;
a parent process for execution by said central processing unit;
a child process for execution by said central processing unit;
a memory accessible by said central processing unit, said memory including a memory area for access by both of said parent process and said child process; and
a run time compiler comprising:
means for invoking said run time compiler during execution of said parent process,
means for compiling said child process;
means for executing said child process, and
means employing said memory area for exchanging information between said child process and said parent process.

2. The computer apparatus of claim 1 wherein said means for compiling includes means for compiling a plurality of independent child processes; and wherein said means for executing includes means for executing said child processes at run time as the parent process is executed.

3. The computer apparatus of claim 1 wherein said means for invoking said run time compiler includes means employing a function call for invoking said compiler from said parent process.

4. The computer apparatus of claim 3 wherein said child process includes a plurality of objects; wherein said function call includes a return list; and wherein said means for executing said child process employs the return list for forwarding said objects to the parent process from the child process.

5. The computer apparatus of claim 3 wherein said child process includes a plurality of data objects and code objects; and wherein said means for executing said child process employs the return list for forwarding said data objects and said code objects to the parent process from the child process.

6. The computer apparatus of claim 1 wherein said parent process is compiled before run time to exclude execution code for a plurality of child processes; and wherein said parent process includes means for selecting at least one of said child processes at run time, and means for invoking said run time compiler process to compile and execute said at least one of said child processes at run time.

7. The computer apparatus of claim 6 wherein said means for compiling includes means for compiling a plurality of said child processes; and wherein said means for executing includes means for executing said child processes at run time as the parent process is executed.

8. The computer apparatus of claim 7 wherein said parent process employs information in said memory area; and wherein said means employing said memory area includes means for providing said child processes with access to said information employed by said parent process at run time.

9. The computer apparatus of claim 1 wherein said child process is selected from the list consisting of a function, a procedure, a subroutine, and a program.

10. The computer apparatus of claim 1 wherein each of said parent process and said child process has a pedigree; and wherein said run time compiler further comprises means for checking said pedigree of said parent process and said pedigree of said child process at run time.

11. The computer apparatus of claim 10 wherein said information exchanged between said parent process and said child process includes data having a pedigree; and wherein said run time compiler further comprises means for checking said pedigree of said parent process, said pedigree of said child process, and said pedigree of said data at run time.

12. The computer apparatus of claim 11 wherein said processes and said data have a plurality of quality levels; and wherein said pedigree employs said quality levels.

13. The computer apparatus of claim 10 wherein said data includes a plurality of data elements in a pass list; and wherein said run time compiler further comprises means for checking said pedigree of said pass list.

14. The computer apparatus of claim 10 wherein each of said parent process and said child process has a pedigree; and wherein said run time compiler further comprises means for determining said pedigree of said parent process and said pedigree of said child process at run time, and means for reducing the pedigree of said parent process to the lowest pedigree of said parent and child processes.

15. The computer apparatus of claim 2 wherein each of said parent process and said child processes has a pedigree; and wherein said run time compiler further comprises means for checking said pedigree of said parent process and said pedigrees of said child processes at run time.

16. The computer apparatus of claim 15 wherein said run time compiler further comprises means for employing said parent process and said child processes in a calling tree having a pedigree, means for determining the pedigrees of said parent process and said child processes at run time, and means for reducing the pedigree of said calling tree to the lowest pedigree of said parent process and said child processes.

17. The computer apparatus of claim 1 wherein said means for compiling further comprises means for compiling a plurality of variable objects each of which defines a portion of said memory area; wherein said means employing said memory area includes means for characterizing said portion of said memory area by pedigree; and wherein said child process includes means for employing said variable objects and said pedigree at run time.

18. The computer apparatus of claim 17 wherein each of said variable objects includes a plurality of attributes which are selected from the list including a pointer to a value, the name of said value, the pedigree of said value, and the type of said value.

19. The computer apparatus of claim 18 wherein said means for executing said child process includes means for employing a plurality of lists of said variable objects, means for passing a first list of said variable objects from said parent process to said child process, and means for passing a second list of said variable objects from said child process to said parent process.

20. The computer apparatus of claim 1 wherein said means for compiling includes means for compiling a plurality of independent child processes; wherein said means for executing includes means for executing said child processes in sequence as the parent process is executed; and wherein said means employing said memory area includes means for sharing input and output data between said parent process and said child processes.

21. The computer apparatus of claim 20 wherein said means for compiling further includes means employing argument lists for passing said input and output data.

22. A computer apparatus comprising:
a central processing unit for executing a plurality of processes;
a memory accessible by said central processing unit, said memory including a memory area for access by said processes; and an application program comprising:
- an application process compiled by a first compiler process, and
- a second compiler process residing with said application process, said second compiler process comprising:
  - an intermediate language compiler kernel,
  - means for attaching said compiler kernel to said application process,
  - means for invoking said compiler kernel during execution of said application process, and
  - means employing said memory area for exchanging information between said second compiler process and said application process.

23. The computer apparatus of claim 22 wherein said means for invoking said compiler kernel includes means for compiling a child process, and means for executing said child process; and wherein said means employing said memory area includes means for exchanging information between said child process and said application process.

24. The computer apparatus of claim 22 wherein said application process is a first application process; wherein said plurality of processes executed by said central processing unit includes said first application process and a subsequent second application process; and wherein said means employing said memory area includes means for exchanging information between said first application process and said subsequent second application process.

25. The computer apparatus of claim 22 wherein said application process has a pedigree and includes means for inputting first data, means for outputting second data, and means employing said first and second data for executing logic; and wherein said second compiler process further comprises means for managing the pedigree of said application process.

26. The computer apparatus of claim 22 wherein said means for invoking said compiler kernel includes a programming interface for said application process.

27. The computer apparatus of claim 22 wherein said application process includes means for writing a script at run time; and wherein said means for invoking said compiler kernel includes means for compiling and executing said script.

28. The computer apparatus of claim 22 wherein said means for invoking said compiler kernel includes means for compiling a child process, and means for executing said child process; and wherein said means employing said memory area includes means for exchanging information between said child process and said application process.

29. The computer apparatus of claim 22 wherein said means employing said memory area includes means for accessing a plurality of variable objects in said memory area with said second compiler process.

30. The computer apparatus of claim 29 wherein said means for compiling further comprises means for compiling a plurality of variable objects each of which defines a portion of said memory area; wherein said means employing said memory area includes means for characterizing said portion of said memory area by pedigree; and wherein said child process includes means for employing said variable objects and said pedigree at run time.

31. The computer apparatus of claim 29 wherein each of said variable objects includes a plurality of attributes which are selected from the list including a pointer to a value, the name of said value, the pedigree of said value, and the type of said value.

32. A program product comprising:
- a run time compiler comprising:
  - means for invoking said run time compiler during execution of a parent process,
  - means for compiling a child process;
  - means for executing said child process, and
  - means for exchanging information between said child process and said parent process by employing a memory; and
- signal bearing media bearing said run time compiler.

33. A program product for an application program compiled by a first compiler, said program product comprising:
- a second compiler capable of residing with said application program, said second compiler comprising:
  - an intermediate language compiler kernel,
  - means for attaching said compiler kernel to said application program,
  - means for invoking said compiler kernel during execution of said application program, and
  - means for exchanging information between said second compiler and said application program by employing a memory; and
- signal bearing media bearing said second compiler.

* * * * *